United States Patent
Jenkins et al.

(10) Patent No.: US 8,528,405 B2
(45) Date of Patent: Sep. 10, 2013

(54) FLEXURE ASSEMBLIES AND METHODS FOR MANUFACTURING AND USING THE SAME

(75) Inventors: Lyle J. Jenkins, Scituate, MA (US); Jonathan J. Bernstein, Medfield, MA (US); Donald C. Fyler, Needham, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 692 days.

(21) Appl. No.: 12/631,398

(22) Filed: Dec. 4, 2009

(65) Prior Publication Data

US 2011/0132088 A1 Jun. 9, 2011

(51) Int. Cl.
*G01P 15/10* (2006.01)
(52) U.S. Cl.
USPC .................. 73/514.29; 438/50; 257/E21.214
(58) Field of Classification Search
USPC .................... 73/514.29, 514.32, 504.12, 488, 73/514.01, 514.24; 438/50; 257/E21.214
See application file for complete search history.

(56) References Cited

U.S. PATENT DOCUMENTS

| | | | |
|---|---|---|---|
| 2,931,092 A | 4/1960 | Humphrey | |
| 2,933,706 A | 4/1960 | Stefano | |
| 3,165,713 A | 1/1965 | Mounteer | |
| 3,290,949 A | 12/1966 | Samet | |
| 3,603,159 A | 9/1971 | Morrow | |
| 3,671,766 A * | 6/1972 | Howe | 310/39 |
| 3,893,342 A * | 7/1975 | Florian et al. | 73/514.34 |
| 3,943,778 A * | 3/1976 | Wyse | 74/5 F |
| 4,206,400 A | 6/1980 | Holdren et al. | |
| 4,276,924 A | 7/1981 | Ljung | |
| 4,487,079 A * | 12/1984 | Compton et al. | 73/862.52 |
| 4,771,644 A | 9/1988 | Meron | |
| 4,851,080 A | 7/1989 | Howe et al. | |
| 5,065,626 A * | 11/1991 | Hanson | 73/497 |
| 5,095,749 A * | 3/1992 | Hanson | 73/497 |
| 5,129,983 A * | 7/1992 | Greiff | 216/2 |
| 5,134,881 A * | 8/1992 | Henrion et al. | 73/514.35 |
| 5,186,053 A | 2/1993 | Egley et al. | |
| 5,203,208 A | 4/1993 | Bernstein | |
| 5,209,117 A * | 5/1993 | Bennett | 73/514.16 |
| 5,241,864 A * | 9/1993 | Addie et al. | 73/718 |

(Continued)

OTHER PUBLICATIONS

"Chapter IV: Skylab Design and Operation," [online]. EP-107 Skylab: A Guidebook, National Aeronautics and Space Administration [retrieved Jul. 10, 2009]. Retrieved from the Internet: <http://history.nasa.gov/EP-107/ch4.htm>, Aug. 6, 2004, 34 pages.

(Continued)

*Primary Examiner* — Peter Macchiarolo
*Assistant Examiner* — Samir M Shah
(74) *Attorney, Agent, or Firm* — Goodwin Procter LLP

(57) ABSTRACT

In one embodiment, an accelerometer includes a suspension frame, a proof mass, and a plurality of flexures suspending the proof mass from the suspension frame. The flexures allow the proof mass to deflect in response to an acceleration along a sensitive axis of the accelerometer. Each flexure exhibits an initial spring rate along the sensitive axis of substantially zero.

40 Claims, 14 Drawing Sheets

(56) References Cited

U.S. PATENT DOCUMENTS

| | | | |
|---|---|---|---|
| 5,725,729 | A | 3/1998 | Greiff |
| 5,780,742 | A | 7/1998 | Burns et al. |
| 5,840,199 | A * | 11/1998 | Warren ............... 216/2 |
| 5,856,772 | A | 1/1999 | Foote et al. |
| 5,922,955 | A * | 7/1999 | Brun et al. ........... 73/514.01 |
| 5,969,250 | A | 10/1999 | Greiff |
| 6,073,490 | A | 6/2000 | Konovalov et al. |
| 6,146,044 | A | 11/2000 | Calvet |
| 6,230,567 | B1 | 5/2001 | Greiff |
| 6,257,057 | B1 | 7/2001 | Hulsing, II |
| 6,291,345 | B1 | 9/2001 | Golecki et al. |
| 6,458,698 | B2 | 10/2002 | Golecki et al. |
| 6,583,031 | B2 * | 6/2003 | Lin ............... 438/459 |
| 6,725,719 | B2 | 4/2004 | Cardarelli |
| 6,735,854 | B1 | 5/2004 | Golecki et al. |
| 6,768,181 | B2 | 7/2004 | Dwyer |
| 6,813,412 | B2 * | 11/2004 | Lin ............... 385/19 |
| 6,895,819 | B1 * | 5/2005 | Yachi ............ 73/514.34 |
| 6,912,902 | B2 | 7/2005 | Malametz et al. |
| 6,955,085 | B2 | 10/2005 | Jones et al. |
| 6,991,957 | B2 | 1/2006 | Eskridge |
| 7,100,447 | B2 | 9/2006 | Dwyer |
| 7,243,542 | B2 | 7/2007 | Hulsing, II |
| 7,392,685 | B2 | 7/2008 | Becka |
| 7,472,596 | B1 | 1/2009 | Cardarelli |
| 2002/0046564 | A1 | 4/2002 | Rastegar et al. |
| 2003/0036268 | A1 * | 2/2003 | Brabant et al. ............ 438/689 |
| 2003/0044106 | A1 * | 3/2003 | Lin ............... 385/18 |
| 2003/0049879 | A1 * | 3/2003 | Lin ............... 438/52 |
| 2007/0090475 | A1 | 4/2007 | Karnick et al. |

OTHER PUBLICATIONS

Bernstein et al. "Low-Noise MEMS Vibration Sensor for Geophysical Applications," Journal of Microelectromechanical Systems, vol. 8, No. 4, Dec. 1999,pp. 433-438.
Chopra et al. "Analysis of Boron Strain Compensation in Silicon-Germanium Alloys by Raman Spectroscopy," Applied Physics Letters, vol. 88, 202114, 2006, pp. 1-3.
EerNisse "Stress in Thermal SiO2 During Growth," Appl. Phys. Lettl, vol. 35, No. 1, Jul. 1, 1979, pp. 8-10.
Huang et al. "High Strength Si Wafers with Heavy B and Ge Codoping," Jpn. J. Apl. Phys., vol. 42, 2003, pp. L1489-L1491.
Jaccodine et al. "Measurement of Strains at Si--SiO2 Interface," Appl. Phys. Lett., vol. 37, No. 6, May 1966, pp. 2429-2434.
Teter "A Discussion of Zero Spring Rate Mechanisms Used for the Active Isolation Mount Experiment," National Air and Space Administration, TM-1999-20973, Nov. 1999, 16 pages.
Weinstein "Flexure Pivot Bearings, Part 1" Machine Design, Jun. 10, 1965, pp. 150-157.
Weinstein "Flexure Pivot Bearings, Part 2" Machine Design, vol. 37, No. 16, Jul. 8, 1965, pp. 137-145.
Wolf et al. "Silicon Processing for the VLSI Era, vol. 1: Process Technology," Lattice Press, Mar. 1, 1990, pp. 228-241.
Woodard et al. "Nonlinear Behavior of a Passive Zero-Spring-Rate Suspension System," J. Guidance, vol. 14, No. 1., Jan.-Feb. 1991, pp. 84-89.
Yonenaga et al. "Dynamic Characteristics of Dislocations in Ge-doped and (Ge+B) Codoped Silicon," Journal of Applied Physics, vol. 93, No. 1, Jan. 1, 2003, pp. 265-269.

* cited by examiner

FLEXURE ASSEMBLIES AND METHODS FOR MANUFACTURING AND USING THE SAME

TECHNICAL FIELD

In various embodiments, the present invention relates to flexure assemblies and to methods for manufacturing and using the same.

BACKGROUND

Accelerometers are sensors or transducers that measure acceleration. Accelerometers generally measure acceleration forces applied to a body by being mounted onto a surface of the accelerated body. Typical accelerometer sensors utilize a flexure assembly. More specifically, they may include a pendulous reaction mass (often referred to as a proof mass) suspended from a stationary frame by, for example, one or more flexural suspension members or some other form of pivot mechanism. The flexures enable the proof mass to deflect in response to forces or accelerations along a sensitive axis of the accelerometer, which is generally perpendicular to the plane of the proof mass. In general, the relative displacement of the proof mass is directly proportional to the acceleration of the accelerated body.

Various types of pendulous reaction mass accelerometers exist, including, for example, vibrating beam accelerometers, capacitive accelerometers, capacitive rebalance accelerometers, and translational mass accelerometers. A capacitive accelerometer, for example, features a capacitor between the proof mass and the stationary support structure (i.e., a first capacitor plate is coupled to the moving proof mass, while a second capacitor plate is coupled to the stationary support structure). An acceleration of the proof mass causes a change in the space between the moving and fixed plates of the capacitor, which changes the electrical capacitance of the capacitor and varies the output of an energized circuit. The change in the electrical capacitance of the capacitor is representative of the acceleration or force along the sensitive axis of the accelerometer.

Alternatively, in contrast to this open-loop operation, a force rebalance accelerometer keeps the proof mass in a state of equilibrium by generating a force (e.g., with a mechanical, electrical, or magnetic force generator) that opposes the specific force applied along the sensitive axis of the proof mass by the acceleration acting thereon. The amount of force that is generated by the force generator in order to keep the proof mass in its equilibrium state is indicative of the acceleration along the sensitive axis of the accelerometer.

Generally, it is desirable to have extremely low parasitic forces along the sensitive axis of the accelerometer because the parasitic forces cannot easily be differentiated from sensed accelerations. In addition, the flexures suspending the proof mass of the accelerometer are generally designed to limit motion to the unique sensitive axis of the accelerometer. Thus, high rigidity in the flexures in the directions orthogonal to the sensitive axis of the accelerometer is typically necessary in order to precisely define the sensitive axis.

FIG. 1 schematically depicts a portion of an accelerometer 100 that features ordinary, unstressed flexures 104 suspending a proof mass 108. The ordinary, unstressed flexures 104 can be made to be very flexible along the sensitive axis 112 of the accelerometer 100, but will always have a non-zero spring rate, as illustrated in FIG. 2. This non-zero spring rate, which may be viewed as a parasitic force acting along the sensitive axis 112 of the accelerometer 100, introduces an error term into the acceleration reading. The spring rate may be reduced by making the flexures 104 longer and/or thinner, but this will disadvantageously also reduce rigidity in the directions orthogonal to the sensitive axis 112.

Alternatively, high performance proof-mass based accelerometers may achieve a zero spring rate by using electric or magnetic fields, as opposed to unstressed flexures, to suspend the proof mass. However, electrically or magnetically suspended accelerometers are much more complicated and expensive than flexure suspended accelerometers.

Accordingly, a need exists for improved flexure suspended accelerometers and for methods of manufacturing and using the same.

SUMMARY OF THE INVENTION

Flexure assemblies in accordance herewith allow substantially unconstrained motion in one direction, while being essentially rigid in directions orthogonal thereto. The flexure assemblies exhibit spring rates along a first axis of substantially zero. These flexure assemblies may be pre-stressed in a variety of ways in order to lower their initial spring rates. They may then be employed, for example, to suspend a proof mass in a force rebalance accelerometer, although embodiments of the invention also find application in other devices, such as flexural pivots. Advantageously, by reducing the spring rate of the flexures in a flexure suspended accelerometer to substantially zero, error terms in the acceleration reading that would otherwise be introduced by having a non-zero spring rate are avoided. In addition, by maintaining, at the same time, rigidity in the flexures in directions orthogonal to the sensitive axis of the accelerometer, the sensitive axis remains precisely defined.

In general, in one aspect, embodiments of the invention feature an accelerometer that includes a suspension frame, a proof mass, and a plurality of flexures that suspend the proof mass from the suspension frame and allow the proof mass to deflect in response to an acceleration along a sensitive axis of the accelerometer. In addition, each flexure may be pre-stressed such that its initial spring rate along the sensitive axis is substantially zero. For the purposes of this disclosure, the initial spring rate of a pre-stressed flexure is substantially zero if it is less than approximately $1/100^{th}$ of the non-stressed spring rate. For example, a flexure with a non-stressed spring rate of 3,000 N/m is considered to have an initial spring rate along the sensitive axis of substantially zero if that spring rate is reduced to less than approximately 30 N/m (e.g., by pre-stressing the flexure). Preferably, however, the initial spring rate of the pre-stressed flexure is less than approximately $1/1000^{th}$ of the non-stressed spring rate, and more preferably less than approximately $1/10,000^{th}$ of the non-stressed spring rate.

In various embodiments, each flexure is also essentially rigid (i.e., has a stiffness of greater than approximately 100 times that of the non-stressed stiffness) along at least one axis orthogonal to the sensitive axis. A first capacitive plate may be located in proximity to a first surface of the proof mass and a second capacitive plate may be located in proximity to a second surface of the proof mass. These capacitive plates may compensate for errors in the pre-stressing of the plurality of flexures. For example, the capacitive plates may create a negative electrostatic spring having a force-displacement curve substantially equal in magnitude to and opposite in direction from a force-displacement curve of the plurality of flexures.

The flexures may be pre-stressed in a variety of manners. For example, the suspension frame may be made from a first material and the plurality of flexures may be made from a second material different from the first material. More specifically, the first material (e.g., aluminum) may be chosen so as have a greater coefficient of thermal expansion than the second material (e.g., silicon). In this way, the compression of the flexures may be set by controlling the temperature during the manufacturing process or during operation (e.g., lowering the temperature by a certain amount will cause the suspension frame to shrink at a faster rate than the flexures, thereby compressing the flexures). As another example, the suspension frame and the plurality of flexures may alternatively be made from the same material. In this case, the suspension frame and the plurality of flexures may be sized such that the suspension frame exerts a force (e.g., a compressive force) on the plurality of flexures. More specifically, the suspension frame may be temporarily stretched from a rest position at a time when the plurality of flexures are first coupled thereto. Removing the temporary stretch from the suspension frame allows it to recover its rest position, thereby permanently compressing the plurality of flexures. As yet another example, the accelerometer may feature one or more mechanical forcing mechanisms (e.g., adjustment screws) for controllably compressing the plurality of flexures.

In another embodiment, the plurality of flexures are made from single-crystal silicon and are doped with impurities that put the flexures into compression. For example, each flexure may be manufactured by forming (e.g., growing) an epitaxial layer of a silicon-germanium alloy (or, alternatively, a silicon-germanium-boron alloy) on a silicon wafer. The germanium atoms, being larger than the silicon atoms, expand the crystal lattice and create a compressive stress in the as-grown layer. As another example, each flexure may be manufactured by forming (e.g., depositing, thermally growing, etc.) a silicon dioxide layer on a silicon wafer. In this instance, when the flexure cools, a compressive stress is created in the silicon dioxide layer because of the difference in the coefficients of thermal expansion for silicon dioxide and silicon. More specifically, silicon dioxide has a much smaller coefficient of thermal expansion than silicon and therefore shrinks much less upon cooling. The silicon layer therefore exerts a compressive force on the silicon dioxide layer.

In general, in another aspect, embodiments of the invention feature a flexural pivot. The pivot includes a flange and a plurality of radially-spaced flexures extending from the flange. Each flexure may be pre-stressed such that a torsional spring rate of the flexural pivot is substantially zero. Again, for the purposes of this disclosure, the torsional spring rate of a pre-stressed flexural pivot is substantially zero if it is less than approximately $1/100^{th}$ of the non-stressed spring rate. For example, a flexural pivot with a non-stressed spring rate of 0.001 Nm/rad is considered to have a torsional spring rate of substantially zero if that spring rate is reduced to less than approximately 0.00001 Nm/rad. Preferably, however, the torsional spring rate of the pre-stressed flexural pivot is less than approximately $1/1000^{th}$ of the non-stressed spring rate, and more preferably less than approximately $1/10,000^{th}$ of the non-stressed spring rate.

In various embodiments, the flange is compressed. The flexural pivot may also include i) a base pivot positioned in proximity to a first side of the flange and ii) a rotatable element, free to rotate relative to the base pivot, coupled to a second side of the flange.

In general, in yet another aspect, embodiments of the invention feature a method for fabricating a proof mass assembly. The method includes epitaxially growing, on at least one side (e.g., on first and second sides) of a crystalline material, an alloy having a lattice constant greater than that of the crystalline material in order to form a starting wafer. The starting wafer may then be etched to define a suspension frame, a plurality of flexures extending therefrom, and a proof mass suspended by the flexures. Initially, an inductively coupled plasma etch may be employed for this purpose. Then, a selective etch (e.g., an ethylene-diamine pyrocatechol etch, a tetra-methyl ammonium hydroxide etch, or a potassium hydroxide etch) may be employed to undercut each flexure. Each flexure is stressed (e.g., compressively) by the lattice mismatch between the epitaxially grown alloy and the crystalline material such that its initial spring rate along a first axis is substantially zero. In various embodiments, the crystalline material is silicon. In such a case, the alloy may be, for example, a silicon-germanium alloy or a silicon-germanium-boron alloy.

In general, in still another aspect, embodiments of the invention feature yet another method for fabricating a proof mass assembly. In accordance with this second method, a wafer having an isolated silicon layer proximate at least one surface thereof (e.g., first and second surfaces thereof) is provided. An oxide is then formed (e.g., thermally grown, deposited by chemical vapor deposition, etc.) on at least a portion of each silicon layer. The wafer is then etched to define a suspension frame, a plurality of flexures extending therefrom, and a proof mass suspended by the flexures. Again, an inductively coupled plasma etch may initially be employed for this purpose. Following that, a selective etch (e.g., an ethylene-diamine pyrocatechol etch, a tetra-methyl ammonium hydroxide etch, a potassium hydroxide etch, or a xenon difluoride etch) may be employed to undercut each flexure. The silicon exerts a stress (e.g., a compressive stress) upon the oxide such that an initial spring rate along a first axis of each flexure is substantially zero. In various embodiments, the wafer is a silicon wafer and each silicon layer is isolated from the silicon wafer by an additional oxide layer therebetween.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DESCRIPTION

In various embodiments, the present invention features flexure assemblies having a spring rate of substantially zero along a first axis thereof. In one embodiment, the substantially zero spring constant restraint is achieved by force (imparted, for example, by compressive stress) on mechanical flexures. These flexure assemblies may be employed in, for example, precision accelerometers.

Figure 1:
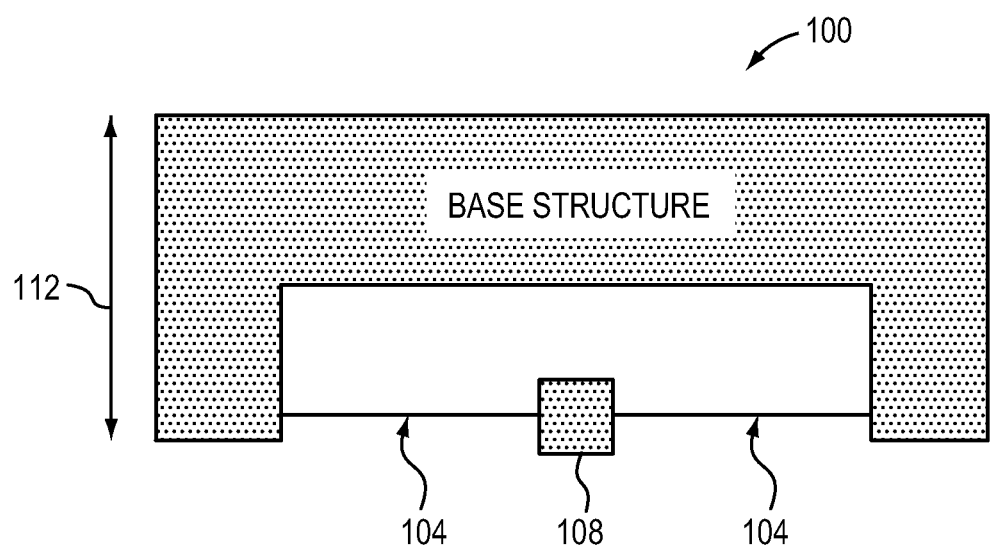
FIG. 1 schematically illustrates a portion of an accelerometer that features ordinary, unstressed flexures suspending a proof mass.
Figure 2:
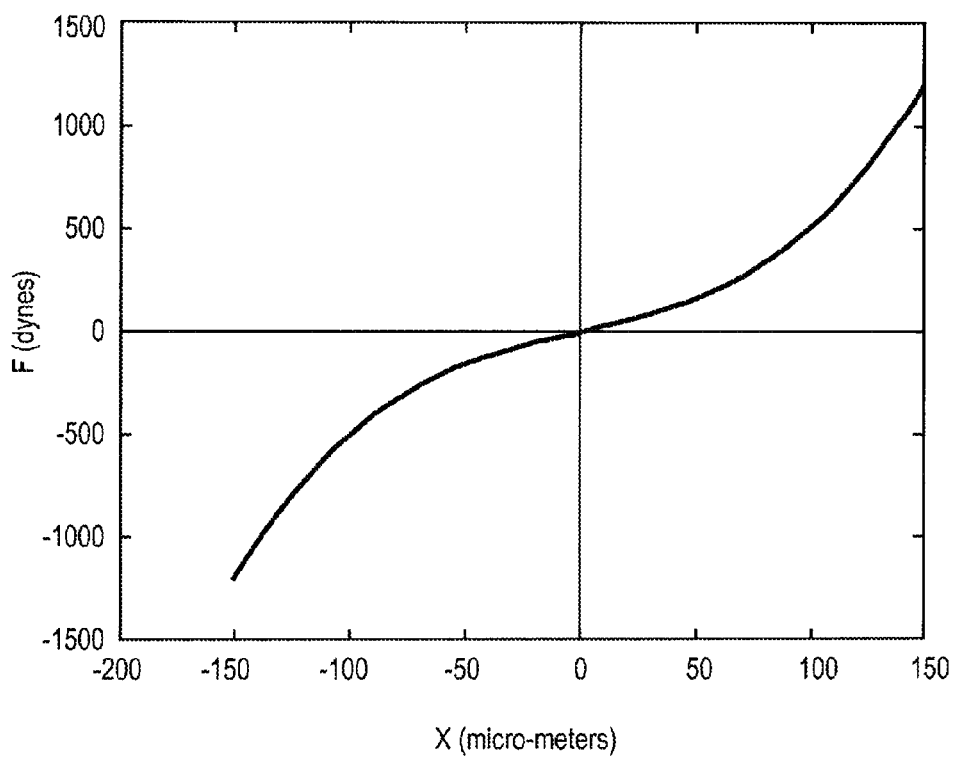
FIG. 2 is a graph of a characteristic force-displacement curve for the accelerometer of FIG. 1.
Figure 3:
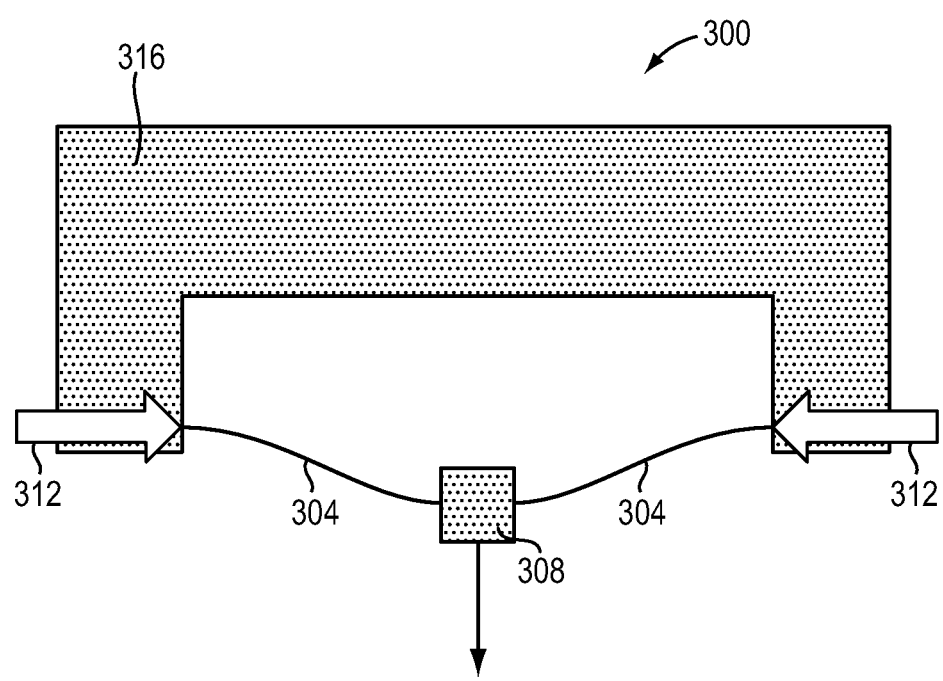
FIG. 3 schematically illustrates a portion of an accelerometer that features pre-stressed flexures suspending a proof mass in accordance with one embodiment of the invention.
Figure 4:
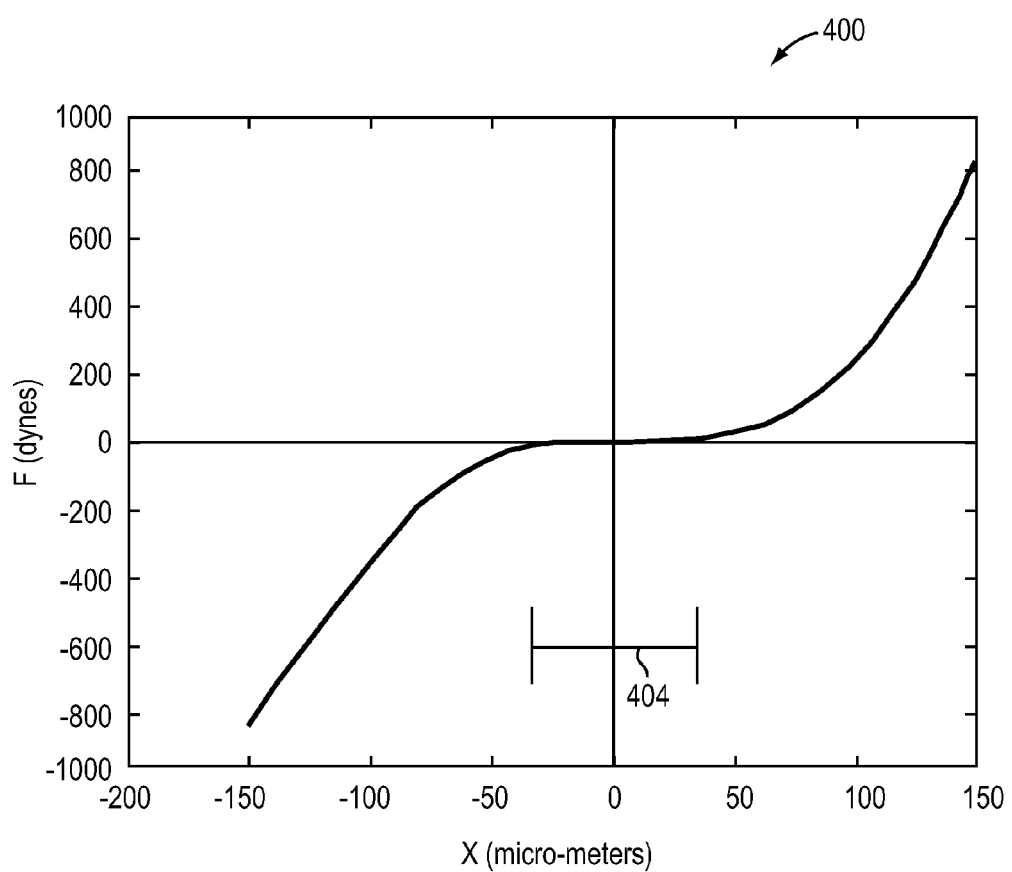
FIG. 4 is a graph of a characteristic force-displacement curve for the accelerometer of FIG. 3.

FIG. 3 schematically depicts a portion of an accelerometer 300 that features pre-stressed flexures 304 suspending a proof mass 308. More specifically, an inwardly-acting compression force is applied to the flexures 304 in the direction of arrows 312. FIG. 4 is a graph 400 of a characteristic force-displacement curve for the accelerometer 300 depicted in FIG. 3. The flexures' initial spring rate (i.e., the spring rate for short deflections) decreases as the compression force is applied thereto. As illustrated in FIG. 4, by carefully controlling the compression force, the initial spring rate (i.e., the spring rate for deflections lying in the range 404) can be brought substantially to zero. The compression force acting on the flexures 304 can be controlled and applied in several different ways, as described herein.

A. Exemplary Monolithic Techniques for Pre-Stressing the Flexures

In one embodiment, the flexure assemblies are monolithically fabricated on a wafer scale. In such a case, pre-stresses in the flexures may be created by using the lattice mismatch between alloys (e.g., silicon alloys) grown epitaxially on a crystalline material (e.g., a silicon wafer). Alternatively, a silicon flexure may be pre-stressed by growing a thermal oxide on one or more surfaces thereof. The silicon compressively stresses the oxide to create the necessary pre-stress that results in a substantially zero initial spring rate for the flexure.

These monolithic techniques lead nicely, moreover, to an economic batch manufacture of the flexure assemblies on the wafer scale. More specifically, monolithic construction leads to improved yields, reduced variability, and reduced manufacturing costs.

A.1. Pre-Stressing the Flexures Through Crystal Lattice Mismatches

One technique for producing a silicon alloy flexure having a controlled compressive stress applied thereto through a crystal lattice mismatch is to grow an epitaxial layer of a silicon-germanium alloy (which may also optionally contain boron and/or carbon) on a silicon wafer.

Boron and carbon atoms in a silicon lattice create lattice shrinkage due to their shorter covalent bonds, while the presence of germanium atoms creates lattice expansion. If the alloy layer is grown epitaxially, a sufficient germanium content will create compressive stress in the as-grown layer.

Figure 5:
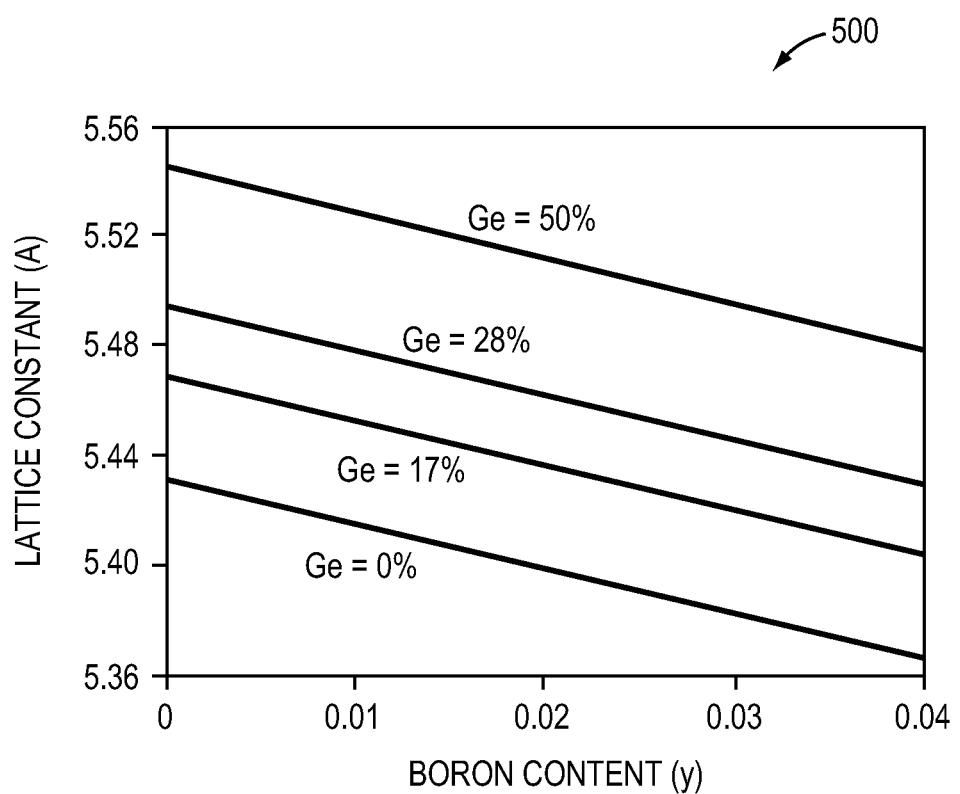
FIG. 5 is a graph showing the lattice constant of silicon-germanium-boron alloys against boron content, with germanium content as a parameter.

FIG. 5 depicts a graph 500 that shows the lattice constant of silicon-germanium-boron alloys against boron content, with germanium content as a parameter. In general, any alloy composition with a germanium concentration large enough will be grown under compressive stress. For example, an alloy with a lattice constant greater than that of pure silicon (approximately 5.44 Angstroms) will have compressive stress if epitaxially grown on a pure silicon substrate. Thus, control of the alloy composition gives precise control of the pre-stress in the flexures.

The boron may be added to the silicon to dope it conductive and also to create a P+ etch stop for certain anisotropic etches, such as an ethylene-diamine pyrocatechol ("EDP") etch, a potassium hydroxide ("KOH") etch, or a tetra-methyl ammonium hydroxide ("TMAH") etch, which may be applied as described below. Moreover, silicon-germanium-boron alloys have a greater resistance to dislocation motion than pure silicon crystals. This is useful in fabricating precision sensors since dislocation motion causes creep, which can cause bias shifts. Pure silicon has a very high elastic limit at room temperature, but silicon-germanium-boron alloys have a higher limit that extends to higher temperatures.

Figure 6A:
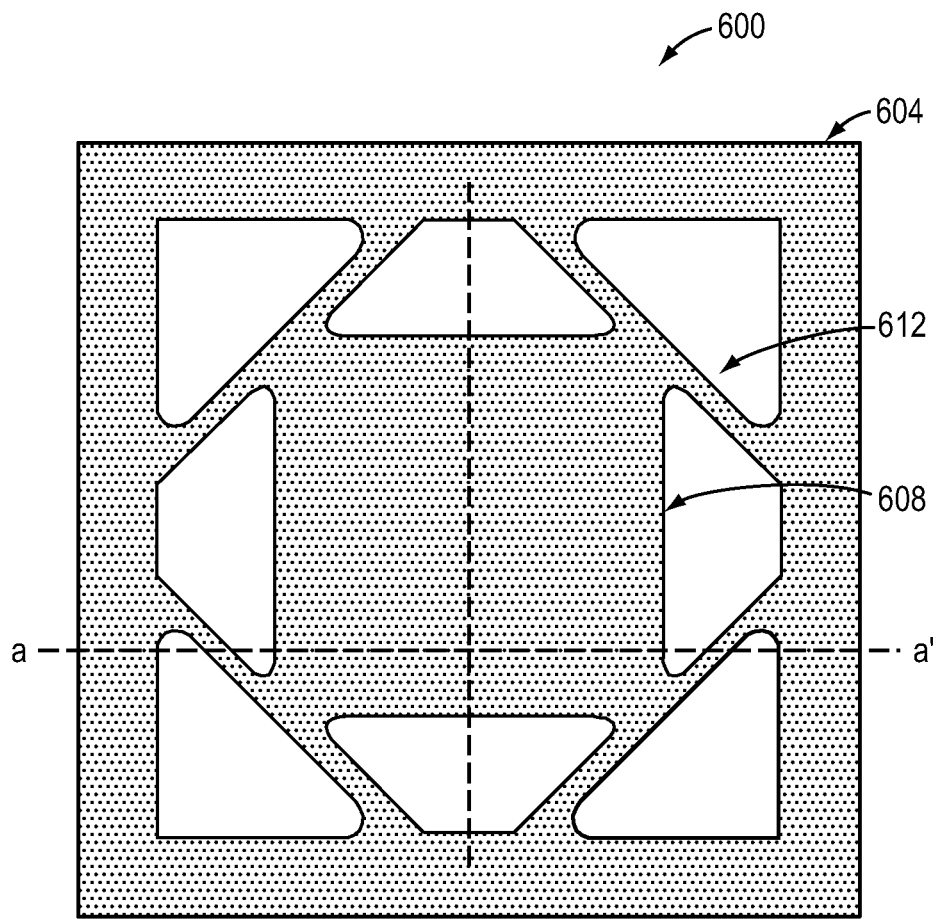
FIG. 6A is a schematic top view of a square proof mass assembly in accordance with one embodiment of the invention.

FIG. 6A is a top view of a portion of an accelerometer 600 (i.e., a proof mass assembly) in accordance with one embodiment of the invention. As illustrated, the proof mass assembly 600 includes a suspension frame 604, a proof mass 608, and a plurality of flexures 612 that extend from the suspension frame 604 and couple to the proof mass 608. FIG. 6D is a cross-sectional view of the proof mass assembly 600 depicted in FIG. 6A along the line a-a'. In one embodiment, as illustrated in FIGS. 6A and 6D, the proof mass 608 is square and the proof mass assembly 600 includes eight flexures 612 arranged in pairs at each corner of the square proof mass 608. As will be understood by one of ordinary skill in the art, and as discussed further below, the proof mass 608 may alternatively have a shape other than a square (e.g., it may have a hexagonal shape). As such, the shape of the proof mass assembly 600 depicted in FIG. 6A is non-limiting.

The flexures 612 suspend the proof mass 608 and allow the proof mass 608 to deflect in response to an acceleration applied along a sensitive axis of the accelerometer 600 (i.e., along an axis running into and out of the page on which FIG. 6A is illustrated). As described with reference to FIGS. 6B-6D, each flexure 612 is pre-stressed such that its initial spring rate along the sensitive axis is substantially zero. Moreover, each flexure may, at the same time, remain sufficiently short and sufficiently thick so as to be essentially rigid along one or more axes orthogonal to the sensitive axis. For example, with a 1 to 10 mm suspension frame 604 and a 0.5 to 7 mm proof mass 608, each flexure 612 may be shorter than 2 mm and wider than 5 microns. Unlike in prior art systems, neither the length nor the width of the flexures 612 needs to be sacrificed (i.e., be made longer or thinner, respectively) in order to achieve a substantially zero spring rate along the sensitive axis.

Figure 6B:
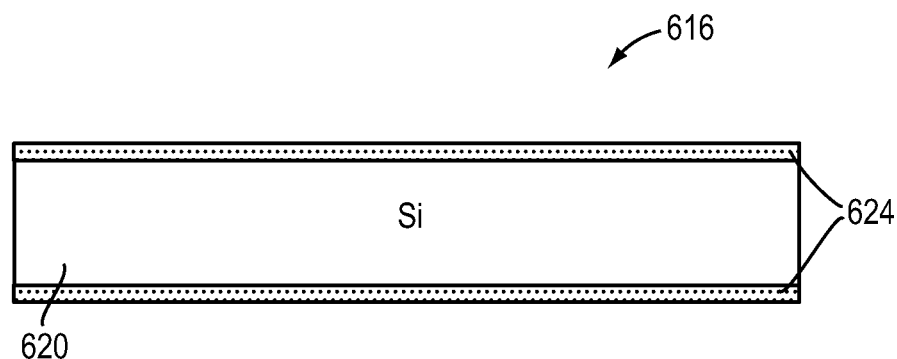
FIGS. 6B-6D illustrate an exemplary method of fabricating the square proof mass assembly of FIG. 6A.
Figure 6C:
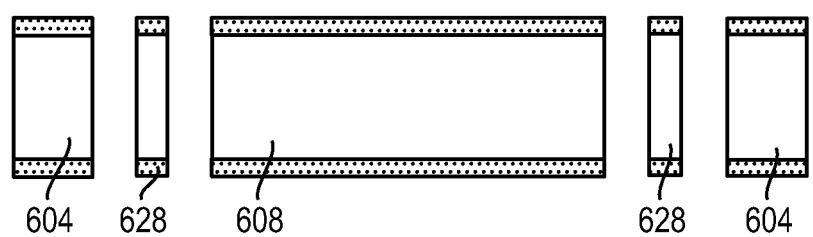
Figure 6D:
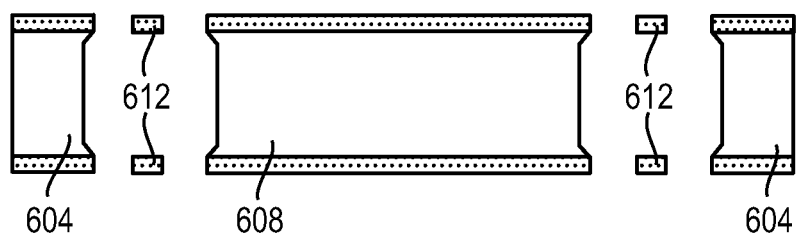

An exemplary method for fabricating the proof mass assembly 600 is illustrated in FIGS. 6B-6D. As illustrated in FIG. 6B, a starting wafer 616 includes a crystalline material 620, such as a silicon layer, having first and second sides thereof coated with an alloy 624. The alloy 624 may be epitaxially grown on the crystalline material 620. In one embodiment, the alloy 624 has a lattice constant greater than that of the crystalline material 620. For example, where the crystalline material 620 is a silicon layer, the alloy 624 may be a silicon-germanium-boron alloy (or, in some embodiments, simply a silicon-germanium alloy) having a lattice constant greater than approximately 5.44 Angstroms.

Photolithography may be used to define areas of the wafer 616 to be etched. With reference to FIG. 6C, an inductively coupled plasma ("ICP") etcher may then be used to etch through the wafer 616. The suspension frame 604, proof mass 608, and narrow sections 628 that will become flexures 612 are defined during this etch. Finally, as illustrated in FIG. 6D, a selective etch that does not attack the P+ silicon may be used to undercut each flexure 612 (i.e., to remove the lightly doped material between the flexures 612 on the front and back surfaces of the wafer 616). The selective etch may be, for example, an EDP etch, a TMAH etch, or a KOH etch. As a result of this process, each flexure 612 is, as described above, compressively stressed by the lattice mismatch between the epitaxially grown alloy 624 and the crystalline material 620 such that its initial spring rate along the sensitive axis of the proof mass assembly 600 is substantially zero.

Figure 7A:
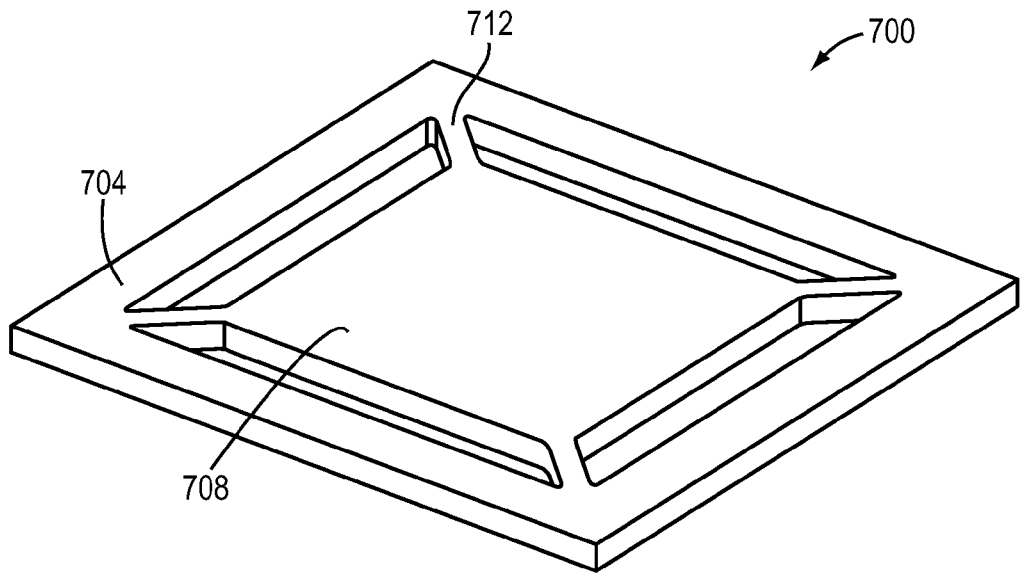
FIG. 7A is a schematic perspective view of a square proof mass assembly before the flexures are undercut in accordance with another embodiment of the invention.
Figure 7B:
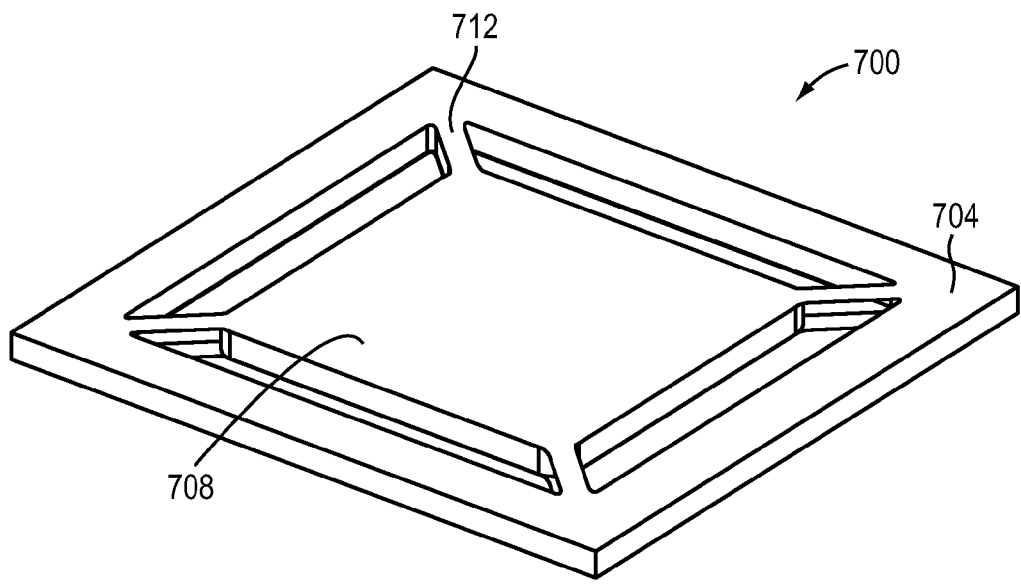
FIG. 7B is a schematic perspective view of the square proof mass assembly of FIG. 7A after the flexures have been undercut.

An alternative design for a proof mass assembly 700 is depicted in FIGS. 7A and 7B. In this design, radial flexures 712 extend from a suspension frame 704 and couple to the four corners of a square proof mass 708. FIG. 7A depicts the proof mass assembly 700 after the ICP etch but prior to the selective etch (i.e., before the flexures 712 are undercut), whereas FIG. 7B depicts the proof mass assembly 700 after the selective etch has removed the material between the flexures 712.

Figure 8:
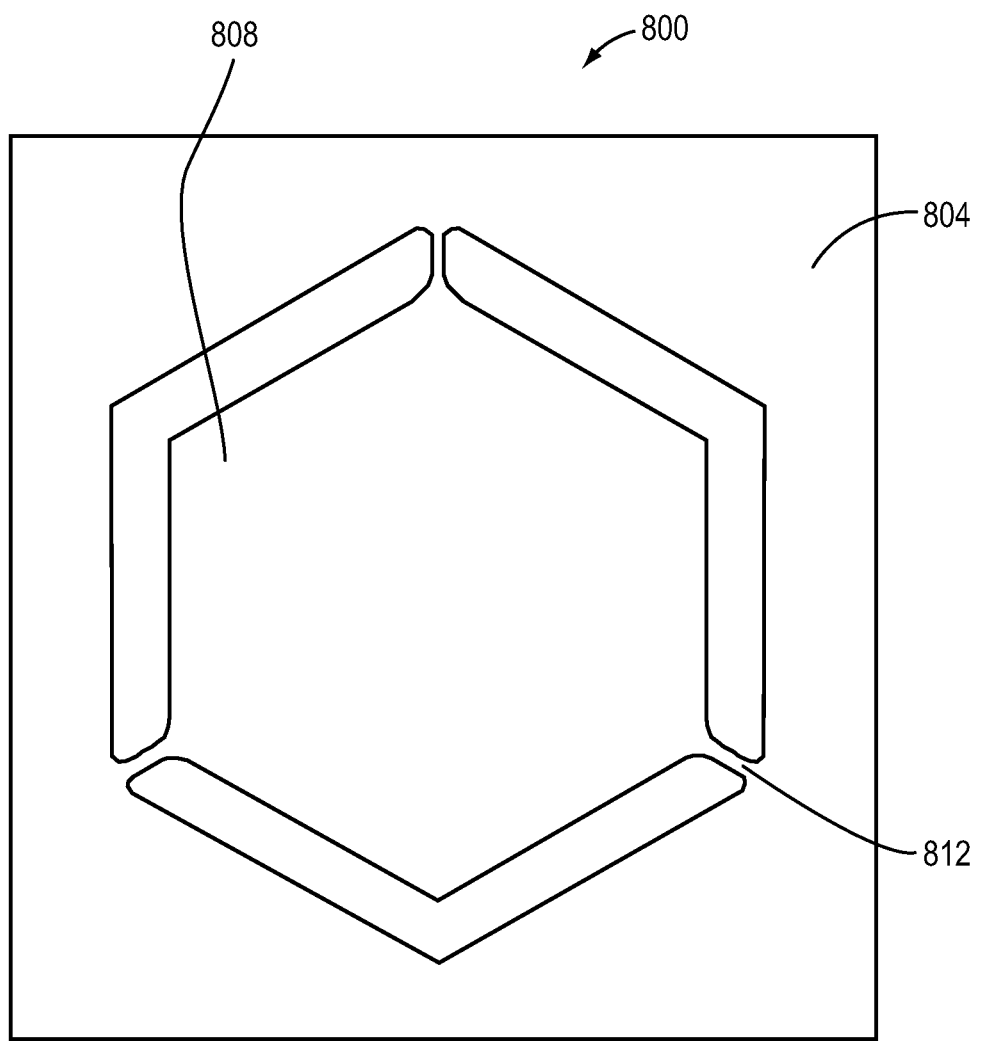
FIG. 8 is a schematic top view of a hexagonal proof mass assembly in accordance with one embodiment of the invention.

The proof mass assemblies 600, 700 depicted in FIGS. 6A, 7A, and 7B take advantage of the 4-fold symmetry of <100> oriented silicon wafers. In some cases, it may be desirable to use a wafer with a 3-fold or 6 fold symmetry, such as is obtained with a <111> orientation wafer. FIG. 8 depicts a proof mass assembly 800 having a suspension frame 804 and a hexagonal proof mass 808 suspended therefrom by three pairs of flexures 812, fabricated on a <111> wafer. In general, choosing a design that reflects the symmetry of the silicon crystal ensures that each of the flexures has identical properties, such as spring constant. In addition, since the undercut etch rate depends on the crystallographic orientation for the selective anisotropic etches (such as EDP, TMAH, and KOH), choosing a design that follows the crystallographic symmetry also ensures that each flexure will undercut at the same rate.

A.2. Pre-Stressing the Flexures by Thermal Oxide Growth or Deposition

A second method for fabricating a proof mass assembly having compressively-stressed flexures is to form (e.g., grow or deposit) a compressively-stressed oxide film on a silicon surface. One such exemplary process is illustrated in FIGS. 9A-9F, the end result of which is a substantially square proof mass assembly of the type depicted in FIG. 6A. In this case, as explained below, an oxide film surrounding the silicon flexures protects the enclosed silicon from the undercut etch step. As such, a heavily boron doped silicon is not required. It may, however, be desirable to use a P+ etch stop, for example to ensure high conductivity or to protect any silicon exposed by pinholes or other defects in the oxide layer.

Figure 9A:
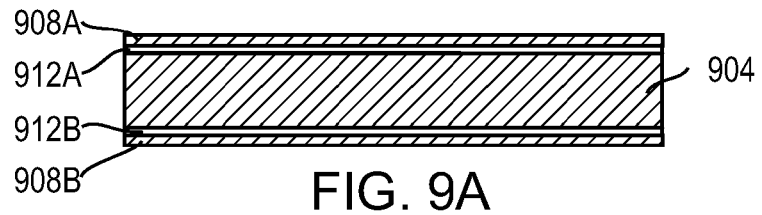
FIGS. 9A-9F illustrate another exemplary method of fabricating the square proof mass assembly of FIG. 6A.

FIG. 9A depicts a silicon wafer 904 having silicon layers 908A, 908B isolated from first and second surfaces of the silicon wafer 904 by intermediate oxide layers 912A, 912B. This silicon wafer 904 with an oxide isolated silicon layer 908 on both sides is generally referred to as a wafer with double sided silicon-on-insulator ("SOI") layers. In one embodiment, the SOI layers are the desired thickness of the final flexures, except that if a thermal oxide is grown, as described below, this will consume part of the silicon layer 908. The silicon 908 lost is typically estimated as half of the thickness of the resulting thermal oxide. For an oxide deposited by chemical vapor deposition ("CVD"), no change in the silicon layer thickness generally results.

Figure 9B:
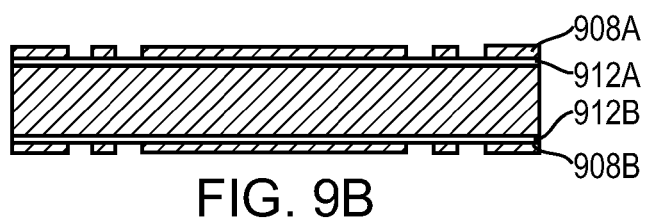
Figure 9C:
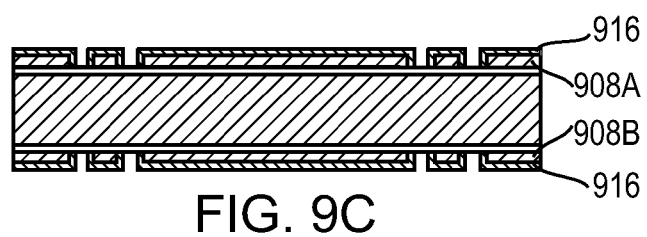

Once the wafer with double sided SOI layers is provided, the next step, as illustrated in FIG. 9B, is to photolithographically define the flexures, proof mass, and suspension frame. The silicon layers 908A, 908B are etched vertically to their respective buried oxide layers 912A, 912B with, for example, a plasma etcher using an ICP etch, such as the Bosch process. Then, as illustrated in FIG. 9C, a further oxide 916 is formed (e.g., thermally grown or deposited by CVD) on the remaining portions of the silicon layers 908A, 908B. For example, silicon dioxide 916 may be grown at a temperature lying between 1000° C. and 1200° C. Measurements of compressive stress show that for most thermally grown oxides, a compressive stress of about 300 MPa results. Alternatively, if the silicon dioxide 916 is deposited by CVD, the silicon dioxide 916 may be annealed at a high temperature (i.e., greater than 900° C.). This anneals the stress and creates a repeatable thermal stress. In either case, the silicon layer 908A, 908B of each flexure 928 (see FIG. 9F) that results from the steps described below exerts a compressive stress upon the silicon dioxide 916 such that an initial spring rate along a sensitive axis of each flexure 928 is substantially zero. More specifically, when the device cools, a compressive stress is created in the silicon dioxide 916 because of the difference in the coefficients of thermal expansion between the silicon dioxide 916 and the silicon layers 908A, 908B. In particular, the silicon dioxide 916 has a much smaller coefficient of thermal expansion than the silicon layers 908A, 908B and therefore shrinks much less upon cooling. The silicon layers 908A, 908B therefore exert a compressive force on the silicon dioxide 916.

Figure 9D:
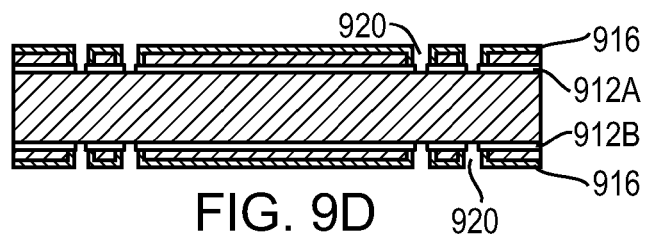
Figure 9E:
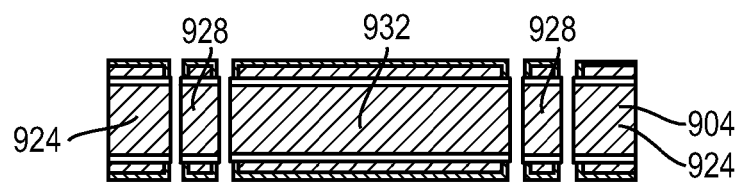

Following the formation of the silicon dioxide 916 on the silicon layers 908A, 908B, a second photolithography step and plasma etch may be used to remove, as illustrated in FIG. 9D, the oxide 912A, 912B from the bottom of the trenches 920. Then, as illustrated in FIG. 9E, an ICP etch may be used to etch through the silicon wafer 904, which may be temporarily placed on a carrier wafer (not shown) to avoid the escape of backside helium cooling gas. This etch defines the suspension frame 924, the flexures 928 extending therefrom, and the proof mass 932 that is suspended by the flexures 928. Finally, as illustrated in FIG. 9F, each flexure 928 may be undercut by employing a selective etch, such as an EDP etch, a TMAH etch, a KOH etch, or a xenon difluoride etch.

Advantageously, the pre-stress in each flexure 928 can be controlled by controlling the thickness of the oxide 916. For example, the thickness of the oxide 916 may be trimmed after fabrication and/or during testing, thereby allowing precise control of the pre-stress in, and the resulting spring of, each flexure 928.

A.3. Completing the Accelerometer Design

Figure 9F:
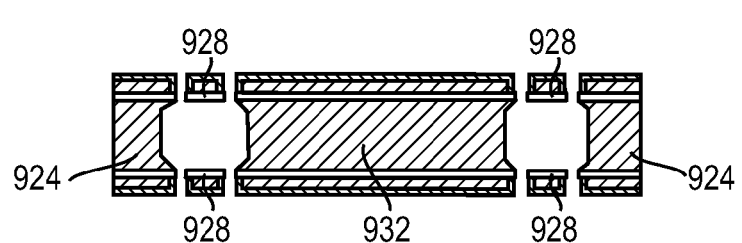

The monolithic proof mass assembly depicted in FIG. 6D or FIG. 9F may next be sandwiched between two other wafers to form capacitive pickoff and force rebalance electrodes, as is well known in the art of fabricating wafer thick accelerometers. These upper and lower wafers may be fabricated from, for example, either silicon or glass. One advantage to glass wafers is that one can see through them, which allows for easy alignment and the possibility of using an anodic bond process to attach the glass wafers to the proof mass assembly.

Figure 10A:
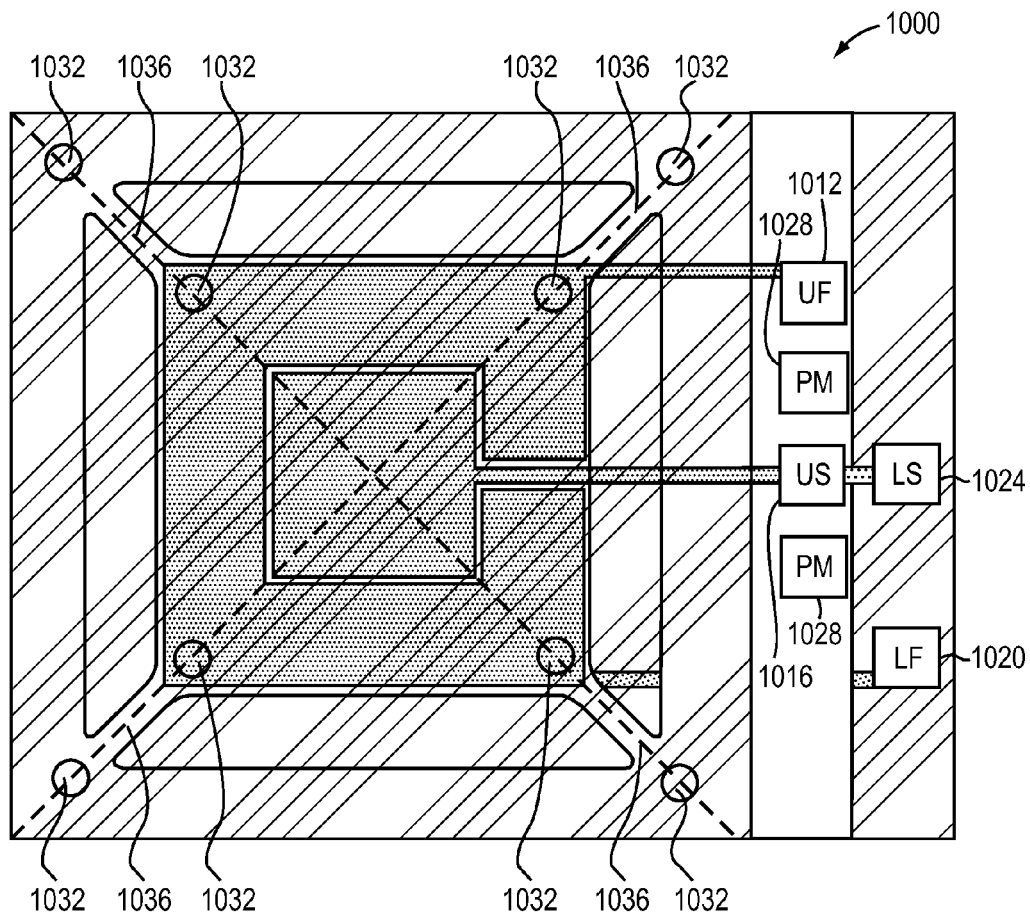
FIGS. 10A and 10B illustrate schematic plan and cross-sectional views, respectively, of a complete accelerometer in accordance with one embodiment of the invention.
Figure 10B:
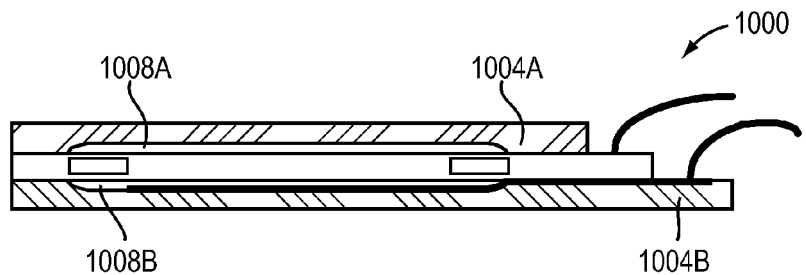

FIGS. 10A and 10B illustrate plan and cross-sectional views, respectively, of a completed three wafer sandwich 1000 with upper and lower glass wafers 1004A, 1004B. Multiple metal traces may be deposited on the glass wafers 1004A, 1004B to provide both sensing and force rebalance capacitors across the upper and lower gaps 1008A, 1008B. FIG. 10A depicts the upper force electrode 1012, the upper sense electrode 1016, the lower force electrode 1020, the lower sense electrode 1024, and the proof mass electrodes 1028. The forcing electrodes 1012, 1020 may be concentric with the central sense electrodes 1016, 1024 to avoid applying a torque to the proof mass. In one embodiment, the entire proof mass and flexures are at one potential, for example ground. If the proof mass assembly is kept at a virtual ground by a charge amplifier circuit, then the proof mass may be held at a virtual ground.

Holes 1032 in the upper and lower electrodes are shown at each end of the flexures 1036. These holes 1032 can be used for an optical interferometric pickoff of position, which can be used to supplement the capacitive pickoffs.

Other circuit approaches to read out the acceleration can also be used. For example, a three electrode device with a single upper and lower capacitor plate can be used if the sensing and force rebalance functions are performed on the same electrodes. In addition, silicon upper and lower wafers can also be used instead of glass. In this case, the thermal stress caused by the difference in the coefficients of thermal expansion between silicon and glass is avoided, leading to greater stability in the accelerometer.

B. Further Exemplary Techniques for Pre-Stressing the Flexures

In addition to the above, a variety of further techniques may be employed in order to pre-stress the flexures. With reference again to FIG. 3, as a first example, the suspension frame 316 for the accelerometer 300 and the flexures 304 that extend therefrom may be made from different materials. More specifically, the suspension frame 316 can be made from a material having a high coefficient of thermal expansion and the flexures 304 made from a material having a lower coefficient of thermal expansion. In this way, compression of the flexures 304 may be set by controlling the temperature during the manufacturing process (e.g., lowering the temperature by a certain amount will cause the suspension frame 316 to shrink by a greater amount than the flexures 304 and thereby compress the flexures 304). In one particular embodiment, the suspension frame 316 is made from aluminum, while the flexures 304 are made from silicon. Alternatively, the suspension frame 316 may be made from glass, while the flexures 304 may be made from silicon. Any appropriate set of materials may be employed. Indeed, the amount of compressive force 312 exerted by the suspension frame 316 on the flexures 304 may be controlled through the appropriate choice of materials for the suspension frame 316 and flexures 304, and by regulating the amount by which the accelerometer 300 is cooled during the manufacturing process.

Alternatively, as a second example, the suspension frame 316 and the flexures 304 can be made from the same, common material (e.g., silicon). In this case, the suspension frame 316 is temporarily stretched (i.e., in a direction opposite to the arrows 312) during the manufacturing process while it is coupled (e.g., bonded with adhesives) to the flexures 304. Removing the temporary stretch from the suspension frame 316 allows the suspension frame 316 to recover its original, rest position, thereby permanently compressing the flexures 304 in the direction of arrows 312. Again, the amount of compressive force 312 exerted by the suspension frame 316 on the flexures 304 may be controlled. Principally, for a suspension frame 316 of given dimension, longer flexures 304 coupled between the proof mass 308 and the suspension frame 316 while the suspension frame 316 is stretched from its original, rest position, will be more greatly compressed when the suspension frame 316 is released in order to return to its original, rest position.

In yet another example, one or more mechanical forcing mechanisms provide the force 312 that compresses the flexures 304. The mechanical forcing mechanisms may be, for example, adjustable screws, adjustable bolts, or any other type of adjustable fasteners. The mechanical forcing mechanisms may be employed to compress the flexures 304 on their own, or in combination with either of the techniques described above to fine-tune the compression applied to the flexures 304.

Figure 11:
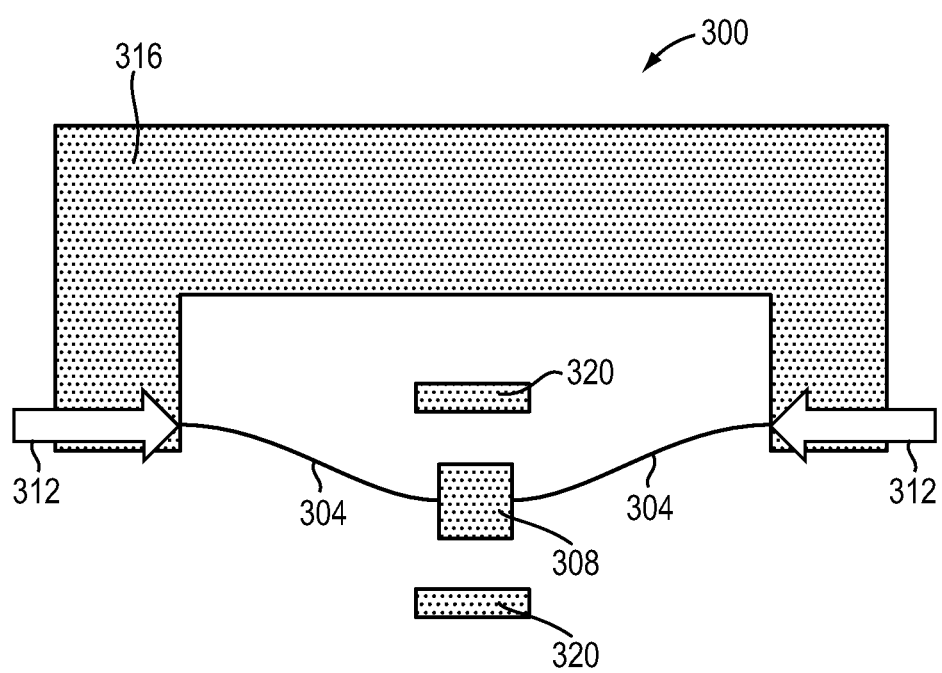
FIG. 11 schematically illustrates a portion of an accelerometer that features pre-stressed flexures suspending a proof mass between a pair of capacitive plates in accordance with one embodiment of the invention.
Figure 12:
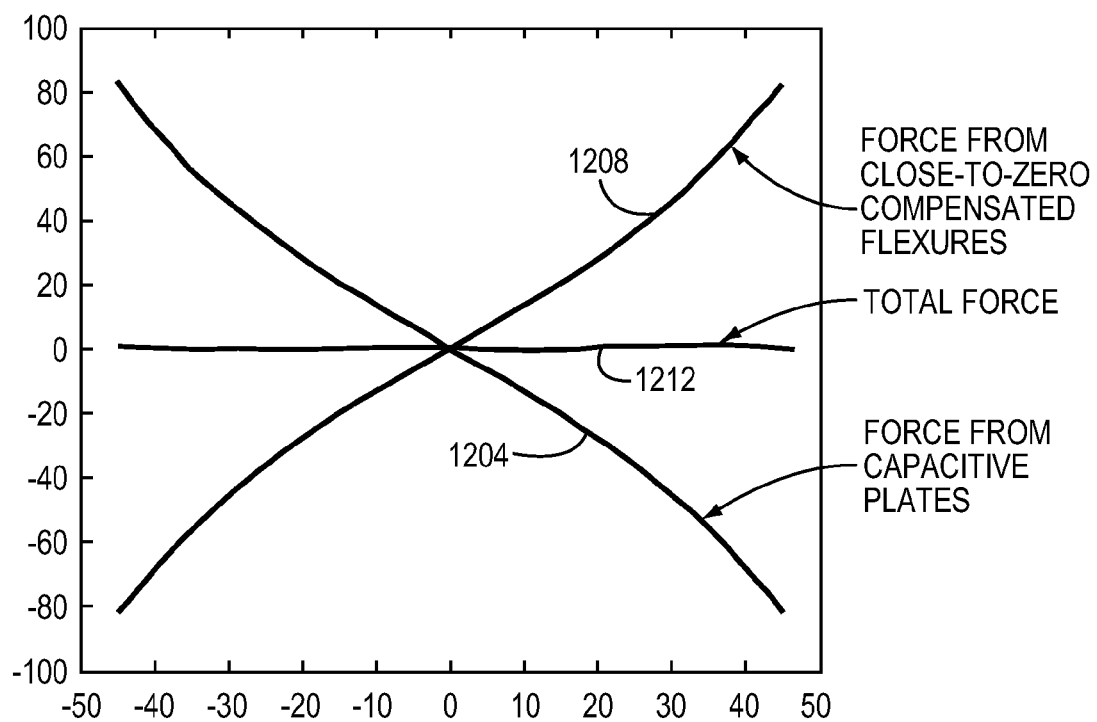
FIG. 12 illustrates force-displacement curves for the capacitive plates of FIG. 11 and the flexures of FIG. 11, and also illustrates the total parasitic forces acting upon the proof mass of FIG. 11.

Optionally, each of the three techniques described above may be improved by employing capacitive plates 320 on opposite sides of the proof mass 308, as illustrated in FIG. 11, in order to compensate for any errors in the pre-stressing of the flexures 304. In one embodiment, as illustrated in FIG. 12, the capacitive plates 320 are designed to create a negative electrostatic spring having a force-displacement curve 1204 substantially equal in magnitude to, but opposite in direction from, a force-displacement curve 1208 of the flexures 304. In particular, the amplitude of the capacitive force provided by the capacitive plates 320 can be adjusted along the curve 1204 by varying the potential difference across the capacitive plates 320. In this way, the total parasitic forces 1212 acting upon the proof mass 308 is substantially zero, as illustrated in FIG. 12. Optionally, this arrangement may be employed to extend the usable "zero spring rate displacement range" (see, e.g., the range 404 depicted in FIG. 4) and/or to provide a method of adjusting the flexures 304 after the accelerometer 300 is entirely assembled and sealed.

C. Flexural Pivots

Figure 13A:
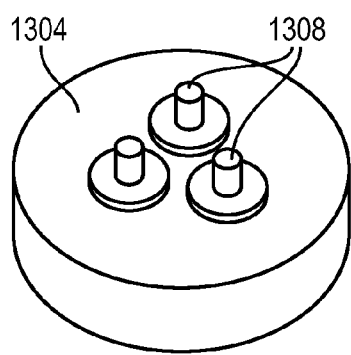
FIGS. 13A-13D schematically illustrate a series of steps for assembling a flexural pivot in accordance with one embodiment of the invention.
Figure 13B:
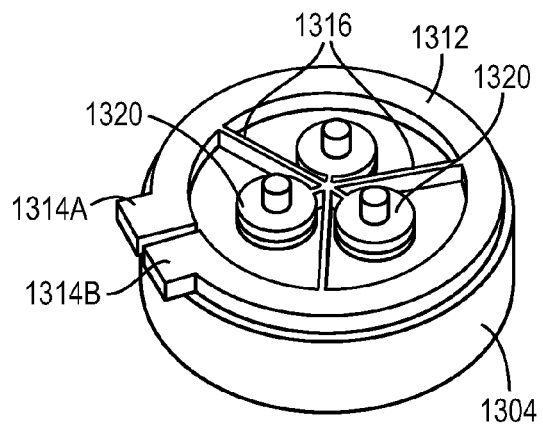

In one embodiment, pre-compressed flexures are arranged radially to create a flexural pivot having a torsional spring rate that is substantially zero. FIGS. 13A-13D depict the steps in one embodiment of a method for assembling such a flexural pivot 1300. As illustrated in FIG. 13A, a base pivot 1304 having a plurality of centralized connection pins 1308 is first provided. Then, as illustrated in FIG. 13B, a flange 1312 is positioned over the base pivot 1304. As shown, the majority of the flange 1312 may be ring-shaped, but its two ends may include projections 1314A, 1314B that are initially separated from one another by a chosen distance. In addition, a plurality of radially-spaced flexures 1316 may extend inwardly from the flange 1312 such that the radially-spaced flexures 1316 meet at an approximate center of the flange 1312, couple to one another, and couple to a plurality of mating connectors 1320 for the connection pins 1308. As illustrated, each mating connector 1320 may feature a through-hole for receiving its corresponding connection pin 1308. In one embodiment, each of the mating connectors 1320 is adhesively bonded to its corresponding connection pin 1308. The substantially ring-shaped flange 1312 and each of the flexures 1316 are not, however, bonded to the base pivot 1304. In this way, the flange 1312 is free to move (e.g., rotate a certain distance) relative to the base pivot 1304.

Figure 13C:
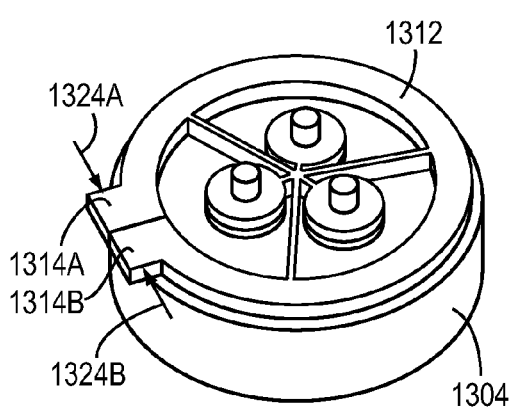

Once the flange 1312 is positioned over the base pivot 1304 and the connection pins 1308 and mating connectors 1320 are bonded to one another, the flange 1312 may be compressed, as illustrated in FIG. 13C, by moving the projections 1314A, 1314B towards one another in the direction of arrows 1324A, 1324B. Compressing the flange 1312 in this way pre-stresses each of the flexures 1316. Advantageously, the degree to which the flexures 1316 are pre-stressed may be controlled by controlling the initial distance between the projections 1314A, 1314B (see FIG. 13B) when designing the flange 1312. In one embodiment, the flexures 1316 are pre-stressed by an amount that leads to a torsional spring rate of the flexural pivot 1300 being substantially zero. Once the flange 1312 is compressed, the projections 1314A, 1314B may be bonded together such that the flange 1312 remains compressed.

Figure 13D:
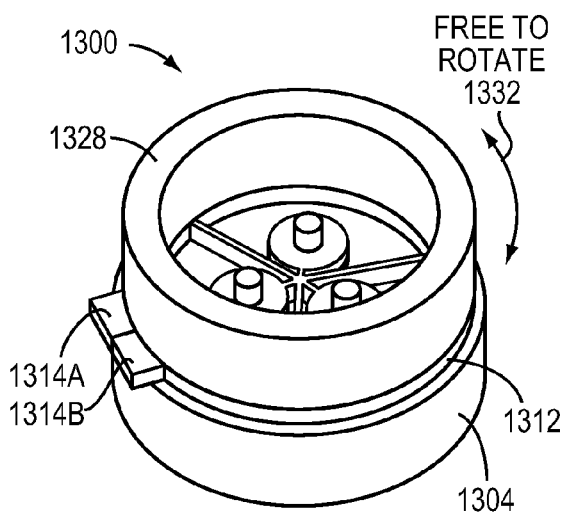

As a final step, with reference now to FIG. 13D, a rotatable element 1328 is coupled to a top surface of the flange 1312. For example, the rotatable element 1328 may be adhesively bonded to the flange 1312. Bonding the rotatable element 1328 to the flange 1312 also helps to maintain the compression between the projections 1314A, 1314B. The rotatable element 1328 may be, as illustrated, ring-shaped. Alternatively, the rotatable element 1328 may have any other shape. Because, as previously described, the flange 1312 is free to move (e.g., rotate a certain distance) relative to the base pivot 1304, the rotatable element 1328, being coupled to the flange 1312, is likewise free to rotate to-and-fro a certain distance in the direction of arrows 1332.

D. Commercial Applications

As described herein, compared to ordinary, unstressed flexures, pre-compressed flexures allow for another degree of freedom in optimizing a flexure design. As such, a much more robust flexure, but with a lower spring rate (e.g., substantially zero, if desired), can be designed.

The pre-compressed flexures may be employed to suspend the proof mass of high precision accelerometers, such as accelerometers used for inertial navigation, avionics, and precision weapons. In addition, the flexures described herein may be used in a variety of other applications. For example, the flexures may be employed in a precision scale to support the mass to be measured, in a linear variable differential transformer ("LVDT") displacement sensor to support its probe in order to keep hysteresis and friction to a minimum (but, with greater lateral stiffness than can be achieved with conventional air-bearings), in a micro-motion linear slide to define the axis of motion, in seismometers for oil and gas exploration, in vibration sensors that locate, for example, buried structures, facilities, and/or tunnels, and in unattended ground sensors. In the case of seismometers, vibration sensors, and unattended ground sensors, the purpose of the pre-stressed flexures is to increase the instrument sensitivity and reduce spring related errors in sensing vibration or acceleration.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An accelerometer, comprising:
a suspension frame;
a proof mass;
a plurality of flexures suspending the proof mass from the suspension frame and allowing the proof mass to deflect in response to an acceleration along a sensitive axis of the accelerometer, each flexure exhibiting an initial spring rate along the sensitive axis of substantially zero; and
circuitry for ascertaining the acceleration influencing the proof mass.

2. The accelerometer of claim 1, wherein each flexure is essentially rigid along at least one axis orthogonal to the sensitive axis.

3. The accelerometer of claim 1, wherein each flexure is pre-stressed.

4. The accelerometer of claim 3 further comprising a pair of capacitive plates for compensating for errors in the pre-stressing of the plurality of flexures.

5. The accelerometer of claim 4, wherein a first capacitive plate is located in proximity to a first surface of the proof mass and a second capacitive plate is located in proximity to a second surface of the proof mass.

6. The accelerometer of claim 4, wherein the capacitive plates create a negative electrostatic spring having a force-displacement curve substantially equal in magnitude to and opposite in direction from a force-displacement curve of the plurality of flexures.

7. The accelerometer of claim 1, wherein the suspension frame is made from a first material and the plurality of flexures are made from a second material different from the first material.

8. The accelerometer of claim 7, wherein the first material has a greater coefficient of thermal expansion than the second material.

9. The accelerometer of claim 7, wherein the first material is aluminum and the second material is silicon.

10. The accelerometer of claim 1, wherein the suspension frame and the plurality of flexures are made from the same material.

11. The accelerometer of claim 10, wherein the suspension frame exerts a compressive force on the plurality of flexures.

12. The accelerometer of claim 1 further comprising at least one mechanical forcing mechanism for controllably compressing the plurality of flexures.

13. The accelerometer of claim 12, wherein the at least one mechanical forcing mechanism is an adjustment screw.

14. The accelerometer of claim 1, wherein the plurality of flexures are made from single-crystal silicon and are doped with impurities that put the flexures into compression.

15. The accelerometer of claim 1, wherein each flexure comprises an epitaxial layer of a silicon-germanium alloy on a silicon layer.

16. The accelerometer of claim 1, wherein each flexure comprises an epitaxial layer of a silicon-germanium-boron alloy on a silicon layer.

17. The accelerometer of claim 1, wherein each flexure comprises a silicon dioxide layer on a silicon layer.

18. A flexural pivot, comprising:
a substantially ring-shaped flange; and
a plurality of radially-spaced flexures extending inwardly and continuously from the flange such that the plurality of radially-spaced flexures couple to one another at a center of the flange, wherein the flexural pivot exhibits a torsional spring rate of substantially zero.

19. The flexural pivot of claim 18, wherein each flexure is pre-stressed.

20. The flexural pivot of claim 18, wherein the flange is compressed.

21. The flexural pivot of claim 18 further comprising i) a base pivot positioned in proximity to a first side of the flange, and ii) a rotatable element, free to rotate relative to the base pivot, coupled to a second side of the flange.

22. The flexural pivot of claim 18 further comprising a base pivot positioned in proximity to a first side of the flange, the base pivot comprising a plurality of connection pins extending therefrom.

23. The flexural pivot of claim 22 further comprising a plurality of connectors, each radially-spaced flexure being coupled to one of the connectors and each connector being coupled to one of the connection pins.

24. A method for fabricating a proof mass assembly, the method comprising:
    epitaxially growing, on at least one side of a crystalline material, an alloy having a lattice constant greater than that of the crystalline material, thereby forming a starting wafer; and
    etching the starting wafer to define a suspension frame, a plurality of flexures extending therefrom, and a proof mass suspended by the flexures, each flexure being stressed by the lattice mismatch between the epitaxially grown alloy and the crystalline material such that its initial spring rate along a first axis is substantially zero.

25. The method of claim 24, wherein each flexure is compressively stressed.

26. The method of claim 24, wherein the crystalline material is silicon.

27. The method of claim 24, wherein the alloy comprises silicon and germanium.

28. The method of claim 27, wherein the alloy further comprises boron.

29. The method of claim 24, wherein etching the starting wafer comprises employing an inductively coupled plasma etch.

30. The method of claim 24, wherein etching the starting wafer comprises employing a selective etch to undercut each flexure.

31. The method of claim 30, wherein the selective etch is selected from the group consisting of an ethylene-diamine pyrocatechol etch, a tetra-methyl ammonium hydroxide etch, and a potassium hydroxide etch.

32. A method for fabricating a proof mass assembly, the method comprising:
    providing a wafer having an isolated silicon layer proximate at least one surface thereof;
    forming an oxide on at least a portion of each silicon layer; and
    etching the wafer to define a suspension frame, a plurality of flexures extending therefrom, and a proof mass suspended by the flexures, the silicon exerting a stress upon the oxide such that an initial spring rate along a first axis of each flexure is substantially zero.

33. The method of claim 32, wherein the silicon exerts a compressive stress upon the oxide.

34. The method of claim 32, wherein the oxide is thermally grown on the silicon.

35. The method of claim 32, wherein the oxide is deposited on the silicon by chemical vapor deposition.

36. The method of claim 32, wherein etching the wafer comprises employing an inductively coupled plasma etch.

37. The method of claim 32, wherein etching the wafer comprises employing a selective etch to undercut each flexure.

38. The method of claim 37, wherein the selective etch is selected from the group consisting of an ethylene-diamine pyrocatechol etch, a tetra-methyl ammonium hydroxide etch, a potassium hydroxide etch, and a xenon difluoride etch.

39. The method of claim 32, wherein the wafer is a silicon wafer.

40. The method of claim 32, wherein each silicon layer is isolated from the wafer by an additional oxide layer therebetween.

* * * * *